Figure 1:
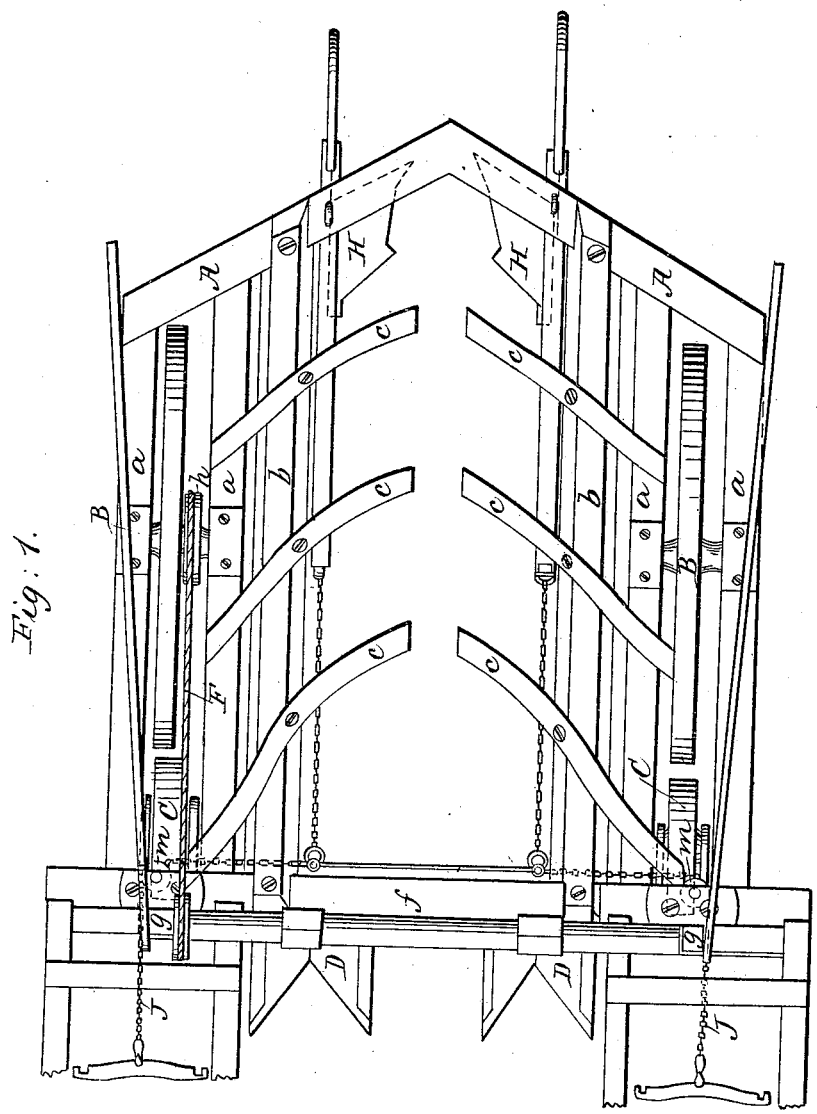

B. A. JENKINS.
Machine for Windrowing Sugar Cane.

No. 28,987.

2 Sheets—Sheet 1.

Patented July 3, 1860.

Witnesses.

Inventor.

B. A. JENKINS.
Machine for Windrowing Sugar Cane.
No. 28,987.
2 Sheets—Sheet 2.
Patented July 3, 1860.
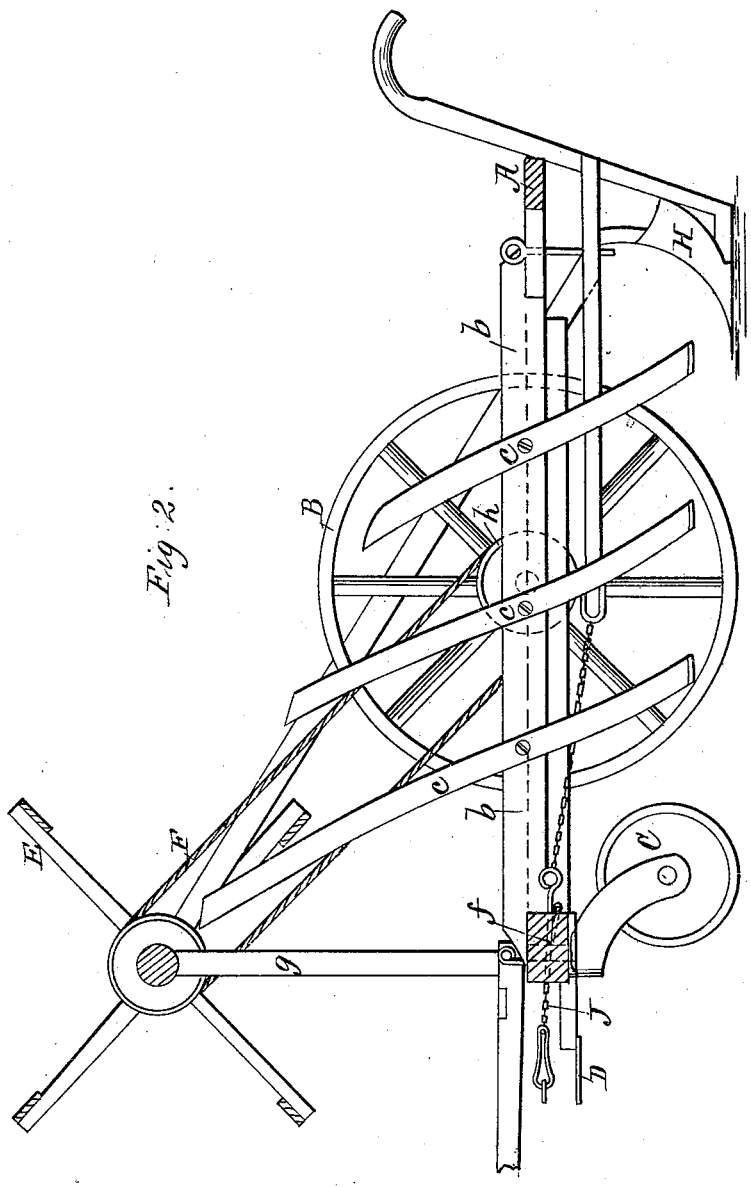

UNITED STATES PATENT OFFICE.

BENJ. A. JENKINS, OF WHITEWATER, WISCONSIN.

IMPROVEMENT IN MACHINES FOR WINDROWING SUGAR-CANE.

Specification forming part of Letters Patent No. 28,987, dated July 3, 1860.

*To all whom it may concern:*

Be it known that I, BENJAMIN A. JENKINS, of Whitewater, in the county of Walworth and State of Wisconsin, have invented a new and useful Machine for Windrowing Sugar-Cane; and I do hereby declare that the following is a full, clear, and exact description of the same, reference being had to the accompany drawings, forming a part of this specification, in which—

Figure 1 is a plan or top view of my machine, and Fig. 2 is a vertical longitudinal section of the same.

Similar letters of reference in each of the several figures indicate corresponding parts.

The object of my invention is to cut down the cane and lay it in continuous lines or windrows in the hollows which exist between the rows, and, when desired, to turn up against each side of the windrow a furrow of earth. By thus cutting down the cane at certain seasons of the year, it is saved from the destructive influence of frost, and by having it lie in windrows with the butts covered by the tops and leaves and the sides compacted together by the furrows bearing against the cane, it is kept cool and prevented from fermenting and souring, and thus the planter saved from the inconvenience arising from the hurrying of the grinding operation and the losses which are very often incurred from the destructive action of the frost upon the cane.

It consists in the combination, in the manner described, of two furrow-plows, arranged to turn furrows in opposite directions upon the windrowed cane, with a cane-windrowing machine, constructed and operating as hereinafter described.

To enable others skilled in the art to make and use my invention, I will proceed to describe its construction and operation.

A represents a frame mounted on large wheels B B and caster-wheels C C, as represented. The frame has three timbers on each side and one at each end.

Between the timbers $a\,a\,a\,a$ the wheels B B are arranged, and on the inner beveled edge of the timbers $b\,b$ curved or inclined gatherers $c\,c\,c$ are arranged. The gatherers of one timber are so set that their lower ends are some distance from the lower ends of the gatherers of the other timber, and thus, while the two sets of gatherers form a receiver for the cane, they do not retain the cane until it is gathered into a gavel, but discharge it into the hollows between the rows as fast as it is cut down, in such manner that windrows are formed, the butts of the cane first cut down being covered by the tops and leaves of the succeeding cane.

On the front of the frame are arranged two knives, D D, which have V-shaped cutting-edges, which are beveled on their under side. These knives are set on opposite sides of the center of the frame, and below the front timber, $f$, so that a space for dirt to escape through exists between them and the timber $f$, and thus when the cutters run into an elevation of soil to prevent an accumulation of dirt on the knives.

Above the knives, on standards $g\,g$, is arranged a revolving reel E, for the purpose of pulling in the cane toward the knives, and also causing it to fall onto the gatherers when cut. This reel is driven by means of a band, F, leading from a pulley, $h$, on the shaft of one of the large truck-wheels.

In rear of the machine are arranged two furrow-plows H H'. Both plows turn the soil toward the center of the machine. They are attached by chains to the front timber of the frame, and may be pivoted to the rear timber, or left to be controlled entirely by hand. These plows, if used, will turn up a furrow of earth against each side of the windrow of cane, and thus compact the stalks together in the hollow between the rows and keep them cool, and thereby retard fermentation or souring before the planter has time to grind it.

To attach the whiffletrees N to the machine which I have described, I arrange pulleys $m\,m$ in the front timber and pass a chain, J, through said timber and around the pulleys, and then hook a whiffletree to each end of the chain, as represented in the drawings. To thus attach the whiffletrees is very essential, for if one horse moves a little faster than the other the machine will not be turned out of its straightforward course, whereas, if the whiffletrees were attached directly to the front timber, any difference in the speed of one horse from that of the other would compel the machine to turn out of its straightforward course.

I do not claim cutting down cane or corn stalks and laying them in separate gavels, stacks, or bundles, as this is old; nor do I claim gatherers which require to be opened and closed at intervals, as exhibited in the machine of Geo. Newcomer, filed in 1857; but What I do claim as my invention, and desire to secure by Letters Patent, is—

The combination, in the manner described, of two furrow-plows, H H, arranged to turn furrows in opposite directions, with a cane-windrowing machine constructed and operating substantially as herein described, for the purpose specified.

B. A. JENKINS.

Witnesses:
  GOODWIN Y. ATLEE,
  R. W. FENWICK.